(12) United States Patent (10) Patent No.: US 8,464,003 B2
Hayashi et al. (45) Date of Patent: Jun. 11, 2013

(54) METHOD AND APPARATUS TO MANAGE OBJECT BASED TIER

(75) Inventors: Shinichi Hayashi, San Jose, CA (US); Toshio Otani, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 463 days.

(21) Appl. No.: 12/707,214

(22) Filed: Feb. 17, 2010

(65) Prior Publication Data

US 2011/0202705 A1 Aug. 18, 2011

(51) Int. Cl.
*G06F 12/12* (2006.01)

(52) U.S. Cl.
USPC .......................................................... 711/133

(58) Field of Classification Search
None
See application file for complete search history.

(56) References Cited

U.S. PATENT DOCUMENTS

| | | | |
|---|---|---|---|
| 2004/0044830 A1* | 3/2004 | Gibble et al. | 711/4 |
| 2004/0162958 A1* | 8/2004 | Kano et al. | 711/170 |
| 2006/0069862 A1* | 3/2006 | Kano | 711/114 |
| 2007/0055713 A1 | 3/2007 | Nagai et al. | |
| 2009/0276588 A1* | 11/2009 | Murase | 711/160 |
| 2010/0107163 A1* | 4/2010 | Lee | 718/1 |

* cited by examiner

*Primary Examiner* — Duc Doan
(74) *Attorney, Agent, or Firm* — Mattingly & Malur, PC

(57) ABSTRACT

Exemplary embodiments provide a technique to manage object based tier to improve allocation of media to unallocated area. In one embodiment, a method of allocating an area of a logical volume to an unallocated area of a virtual volume for a write command comprises: calculating an object location of an object based on the write command and an object allocation information, the write command containing a virtual volume name and a virtual volume address of a virtual volume; selecting a tier from a plurality of tiers based on the calculated object location and an object and tier definition information; selecting a media type from a plurality of media types based on the selected tier and a tier and media definition information; and selecting a logical volume from a plurality of logical volumes based on the virtual volume specified by the write command, the object allocation information, a pool information, and the selected media type.

20 Claims, 21 Drawing Sheets

302

RAID GROUP INFORMATION

| 401 RAID GROUP NAME | 402 MEDIA NAME | 403 MEDIA TYPE | 404 RAID LEVEL | |
|---|---|---|---|---|
| RG A | SSD A, SSD B, SSD C, SSD D | SSD | RAID 10 (2D+2D) | 405 |
| RG B | HDD A, HDD B, HDD C, HDD D | SAS HDD | RAID 5 (3D+1P) | 406 |
| RG C | HDD E, HDD F, HDD G, HDD H | SATA HDD | RAID 5 (3D+1P) | 407 |
| : | : | : | : | |

303

LOGICAL VOLUME INFORMATION

| 421 LOGICAL VOLUME NAME | 422 LOGICAL VOLUME ADDRESS | 423 MEDIA TYPE | 424 RAID GROUP NAME | 425 RAID GROUP ADDRESS | |
|---|---|---|---|---|---|
| L-VOL A | 0 - 9999 | SSD | RG A | 0 - 9999 | 426 |
| L-VOL B | 0 - 9999 | SSD | RG A | 10000 - 19999 | 427 |
| L-VOL C | 0 - 9999 | SAS HDD | RG B | 0 - 9999 | 428 |
| L-VOL D | 0 - 9999 | SAS HDD | RG B | 10000 - 19999 | 429 |
| : | : | : | : | : | |

304

POOL INFORMATION

| 441 POOL NAME | 442 LOGICAL VOLUME NAME | 443 VIRTUAL VOLUME NAME | |
|---|---|---|---|
| POOL A | L-VOL A, L-VOL B, L-VOL C | V-VOL A, V-VOL B, | 444 |
| POOL B | L-VOL D | V-VOL C | 445 |
| : | : | : | |

VIRTUAL VOLUME INFORMATION

| VIRTUAL VOLUME NAME | VIRTUAL VOLUME ADDRESS | LOGICAL VOLUME NAME | LOGICAL VOLUME ADDRESS |
|---|---|---|---|
| V-VOL A | 0 - 9 | L-VOL A | 0 - 9 |
| V-VOL A | 10 - 19 | L-VOL B | 0 - 9 |
| V-VOL A | 20 - 29 | NOT ALLOCATED | NOT ALLOCATED |
| V-VOL B | 0 - 19 | L-VOL A | 10 - 29 |
| ⋮ | ⋮ | ⋮ | ⋮ |

501, 502, 503, 504, 505, 506, 507, 508

306

TIER AND MEDIA DEFINITION INFORMATION

| TIER | MEDIA TYPE |
|---|---|
| 0 | SSD |
| 1 | SAS HDD |
| 2 | SATA HDD |
| ⋮ | ⋮ |

521, 522, 523, 524, 525

307

OBJECT AND TIER DEFINITION INFORMATION

| OBJECT NAME | TIER |
|---|---|
| TABLE A | 0 |
| TABLE B | 2 |
| INDEX A | 0 |
| ⋮ | ⋮ |
| DEFAULT | 1 |

METHOD AND APPARATUS TO MANAGE OBJECT BASED TIER

BACKGROUND OF THE INVENTION

The present invention relates generally to thin provisioning and tier management and, more particularly, to a method and an apparatus to manage object based tier to improve allocation of media to unallocated area.

In recent years, thin provisioning has become popular. Thin provisioning is a method for allocating area when storage subsystem receives a write command to unallocated area. Currently, a storage subsystem migrates frequently accessed allocated area to fast and expensive media and migrates rarely accessed allocated area to slow and cheap media. However, the storage subsystem cannot determine which media to allocate to unallocated area because the storage subsystem does not have access information for the unallocated area. Therefore, the wrong media may be allocated until the storage subsystem obtains the access frequency.

BRIEF SUMMARY OF THE INVENTION

Exemplary embodiments of the invention provide a method and an apparatus to manage object based tier to improve allocation of media to unallocated area. In specific embodiments, the storage system gets mapping information between the object and the volume address regularly, and selects a tier based on the mapping information and predefined definition between the object and the media when the storage system receives a write command to unallocated area. In this way, the storage system can allocate correct media to unallocated area.

In accordance with an aspect of the present invention, a method of allocating an area of a logical volume to an unallocated area of a virtual volume for a write command comprises: calculating an object location of an object based on the write command and an object allocation information, the write command containing a virtual volume name and a virtual volume address of a virtual volume; selecting a tier from a plurality of tiers based on the calculated object location and an object and tier definition information; selecting a media type from a plurality of media types based on the selected tier and a tier and media definition information; and selecting a logical volume from a plurality of logical volumes based on the virtual volume specified by the write command, the object allocation information, a pool information, and the selected media type.

In some embodiments, the object allocation information comprises information of object name and object address and corresponding virtual volume name and virtual volume address for each object of a plurality of objects. The pool information comprises information of pool name and corresponding logical volume name and corresponding virtual volume name for each pool of a plurality of pools. The media types include HDD (hard disk drive), SSD (solid state drive), SAS (serial attached SCSI) HDD, and SATA (serial advanced technology attachment) HDD. Each object includes an object name and an object address which have a relationship with corresponding virtual volume name and virtual volume address, which have a relationship with corresponding logical volume name and logical volume address.

In specific embodiments, the method further comprises a tier migration process when the tier and media definition information or the object and tier definition information is changed. The tier migration process includes: selecting an object associated with an object name contained in the object and tier definition information; obtaining the tier information corresponding to the selected object from the object and tier definition information; obtaining the media type information corresponding to the obtained tier information from the tier and media definition information; obtaining the virtual volume name and virtual volume address corresponding to the selected object from the object allocation information; obtaining the logical volume name and logical volume address corresponding to the obtained virtual volume name and virtual volume address; obtaining the media type information corresponding to the logical volume having the obtained logical volume name and logical volume address; if the obtained media type information corresponding to the obtained tier information is same as the obtained media type information corresponding to the logical volume having the obtained logical volume name and logical volume address, then continuing the tier migration process for all remaining objects; and if the obtained media type information corresponding to the obtained tier information is not same as the obtained media type information corresponding to the logical volume having the obtained logical volume name and logical volume address, then moving the selected object to the tier specified in the obtained tier information for the selected object, and updating a virtual volume information which contains information of virtual volume name and virtual volume address and corresponding logical volume name and logical volume address for the selected object, and then continuing the tier migration process for all remaining objects.

In some embodiments, the object allocation information is an object allocation information for file and calculating the object location for an object comprises: calculating a file location based on the virtual volume name and virtual volume address specified in the write command and a file allocation information; and calculating the object location of the object based on the calculated file location and the object allocation information for file, the object allocation information for file containing information of object name and object address and corresponding file name and file address. The logical volume is selected based on the file allocation information. The file allocation information comprises information of file name and file address and corresponding virtual volume name and virtual volume address for each file of a plurality of files. Each object includes an object name and an object address which have a relationship with corresponding file name and file address, which have a relationship with corresponding virtual volume name and virtual volume address, which have a relationship with corresponding logical volume name and logical volume address. The method further comprises a tier migration process when the tier and media definition information or the object and tier definition information is changed. The tier migration process includes: selecting an object associated with an object name contained in the object and tier definition information; obtaining the tier information corresponding to the selected object from the object and tier definition information; obtaining the media type information corresponding to the obtained tier information from the tier and media definition information; obtaining the file name and file address corresponding to the selected object from the file allocation information; obtaining the virtual volume name and virtual volume address corresponding to the obtained file name and file address from the object allocation information for file; obtaining the logical volume name and logical volume address corresponding to the obtained virtual volume name and virtual volume address; obtaining the media type information corresponding to the logical volume having the obtained logical volume name and logical volume address; if the obtained media type information corresponding to the obtained tier information is same as the obtained media type information corresponding to the logical volume having the obtained logical volume name and logical volume address, then continuing the tier migration process for all remaining objects; and if the obtained media type information corresponding to the obtained tier information is not same as the obtained media type information corresponding to the logical volume having the obtained logical volume name and logical volume address, then moving the selected object to the tier specified in the obtained tier information for the selected object, and updating a virtual volume information which contains information of virtual volume name and virtual volume address and corresponding logical volume name and logical volume address for the selected object, and then continuing the tier migration process for all remaining objects.

In specific embodiments, the object allocation information is an object allocation information for VHD (virtual hard disk drive) and calculating the object location of an object comprises: calculating a VHD location based on the virtual volume name and virtual volume address specified in the write command and a VHD allocation information; and calculating the object location of the object based on the calculated VHD location and the object allocation information for VHD, the object allocation information for VHD containing information of object name and object address and corresponding VHD name and VHD address. The logical volume is selected based on the VHD allocation information. The VHD allocation information comprises information of VHD name and VHD address and corresponding virtual volume name and virtual volume address. Each object includes an object name and an object address which have a relationship with corresponding VHD name and VHD address, which have a relationship with corresponding virtual volume name and virtual volume address, which have a relationship with corresponding logical volume name and logical volume address. The method further comprises a tier migration process when the tier and media definition information or the object and tier definition information is changed. The tier migration process includes: selecting an object associated with an object name contained in the object and tier definition information; obtaining the tier information corresponding to the selected object from the object and tier definition information; obtaining the media type information corresponding to the obtained tier information from the tier and media definition information; obtaining the VHD name and VHD address corresponding to the selected object from the VHD allocation information; obtaining the virtual volume name and virtual volume address corresponding to the obtained VHD name and VHD address from the object allocation information for VHD; obtaining the logical volume name and logical volume address corresponding to the obtained virtual volume name and virtual volume address; obtaining the media type information corresponding to the logical volume having the obtained logical volume name and logical volume address; if the obtained media type information corresponding to the obtained tier information is same as the obtained media type information corresponding to the logical volume having the obtained logical volume name and logical volume address, then continuing the tier migration process for all remaining objects; and if the obtained media type information corresponding to the obtained tier information is not same as the obtained media type information corresponding to the logical volume having the obtained logical volume name and logical volume address, then moving the selected object to the tier specified in the obtained tier information for the selected object, and updating a virtual volume information which contains information of virtual volume name and virtual volume address and corresponding logical volume name and logical volume address for the selected object, and then continuing the tier migration process for all remaining objects.

Another aspect of the invention is directed to an information system including a storage subsystem coupled with an application server for allocating an area of a logical volume to an unallocated area of a virtual volume for a write command. The storage subsystem comprises a processor; a memory; a plurality of logical volumes; and an object allocation module configured to calculate an object location of an object based on the write command and an object allocation information, the write command containing a virtual volume name and a virtual volume address of a virtual volume; select a tier from a plurality of tiers based on the calculated object location and an object and tier definition information; select a media type from a plurality of media types based on the selected tier and a tier and media definition information; and a disk control module configured to select a logical volume from the plurality of logical volumes based on the virtual volume specified by the write command, the object allocation information, a pool information, and the selected media type.

Another aspect of the invention is directed to an interface for managing tiers and media types for a plurality of objects in a system of allocating an area of a logical volume to an unallocated area of a virtual volume for a write command by calculating an object location of an object of the plurality of objects based on the write command, selecting a tier from a plurality of tiers based on the calculated object location and an object and tier definition information, and selecting a media type from a plurality of media types based on the selected tier and a tier and media definition information. The interface comprises computer readable program code devices for receiving from a user a tier corresponding to one of the objects, for each of the plurality of objects; displaying the object and tier definition information containing object names of the objects and corresponding tiers received from the user; receiving from the user a media type corresponding to one of the tiers, for each of the plurality of tiers; and displaying the tier and media definition information containing the tiers and corresponding media types received from the user.

These and other features and advantages of the present invention will become apparent to those of ordinary skill in the art in view of the following detailed description of the specific embodiments.

BRIEF DESCRIPTION OF THE DRAWINGS

FIG. 4 shows an example of RAID group information, the logical volume information, and the pool information.

FIG. 5 shows an example of the virtual volume information, the tier definition information, and the object and tier definition information.

DETAILED DESCRIPTION OF THE INVENTION

Figure 1:
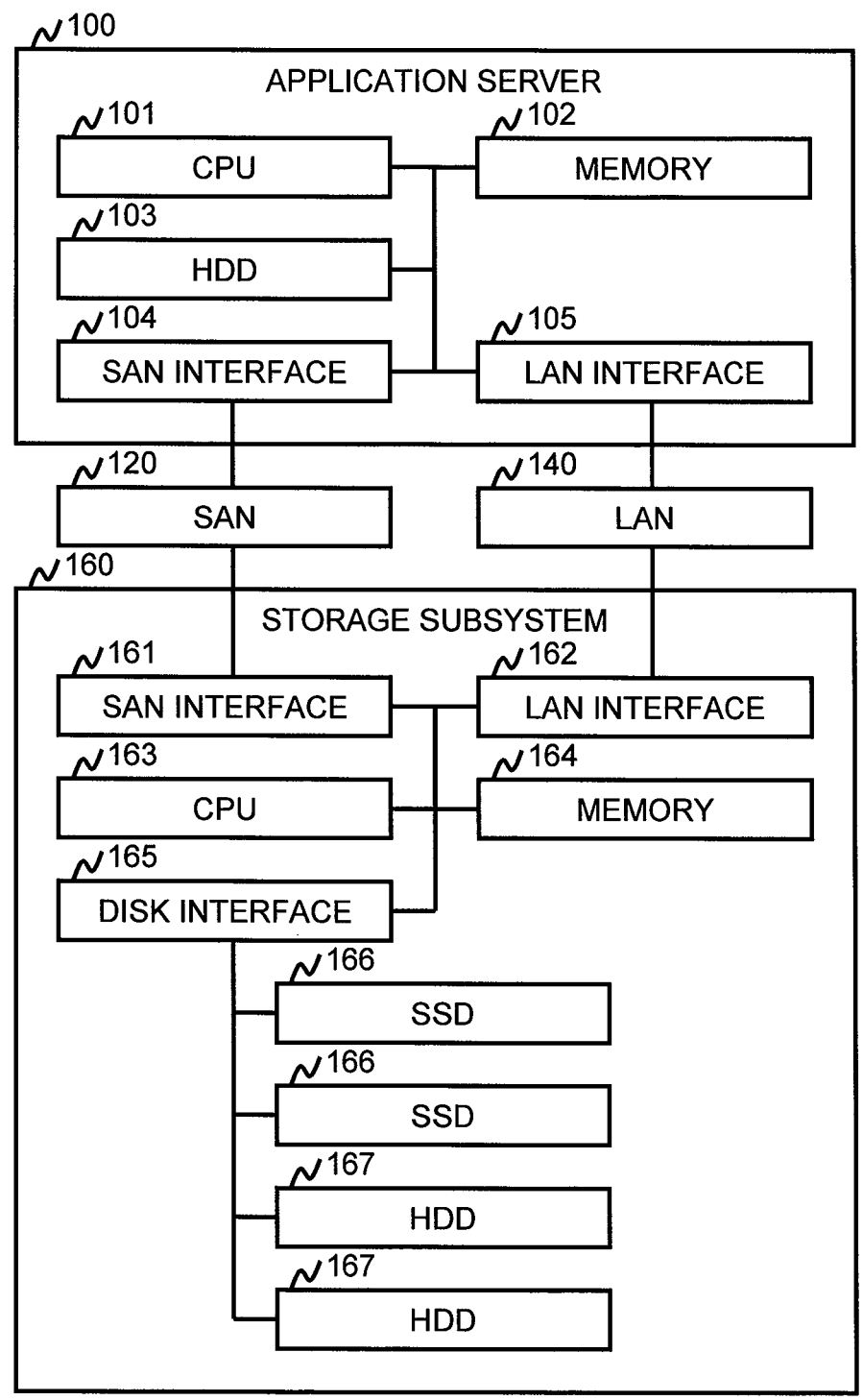
FIG. 1 illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for managing object based tier to improve allocation of media to unallocated area.

First Embodiment

The first embodiment shows relationships involving object to file system to virtual volume to logical volume to RAID group.

A. System Configuration

FIG. 1 illustrates an example of a hardware configuration of an information system in which the method and apparatus of the invention may be applied. The system comprises an application server 100, a SAN (Storage Area Network) 120, a LAN (Local Area Network) 140, and a storage subsystem 160. The application server 100 comprises a CPU (Central Processing Unit) 101, a memory 102, a HDD (Hard Disk Drive) 103, a SAN interface 104, and a LAN interface 105. The CPU 101 reads programs from the memory 102 and executes the programs. The memory 102 reads programs and data from the HDD 103 when the application server 100 starts and stores the programs and the data. The HDD 103 stores programs and data. The SAN interface 104 connects the application server 100 and the SAN 120. The LAN interface 105 connects the application server 100 and the LAN 140. The SAN 120 connects the application server 100 and the storage subsystem 160. The application server 100 uses the SAN 120 to send application data to the storage subsystem 160 and receive application data from the storage subsystem 160. The application server 100 uses the LAN 140 to send management data to the storage subsystem 160 and receive management data from the storage subsystem 160. The LAN 140 connects the application server 100 and the storage subsystem 160. The storage subsystem 160 comprises a SAN interface 161, a LAN interface 162, a CPU 163, a memory 164, a disk interface 165, a SSD (Solid State Drive) 166, and a HDD 167. The SAN interface 161 connects the storage subsystem 160 and the SAN 120. The LAN interface 162 connects the storage subsystem 160 and the LAN 140. The CPU 163 reads programs from the memory 164 and executes the programs. The memory 164 reads programs and data from the HDD 166 and SSD 167 when the storage subsystem 160 starts and stores the programs and the data. The disk interface 165 connects the storage subsystem 160, the SSD 166, and the HDD 167. The SSD 166 stores programs and data. The HDD 167 stores programs and data.

Figure 2:
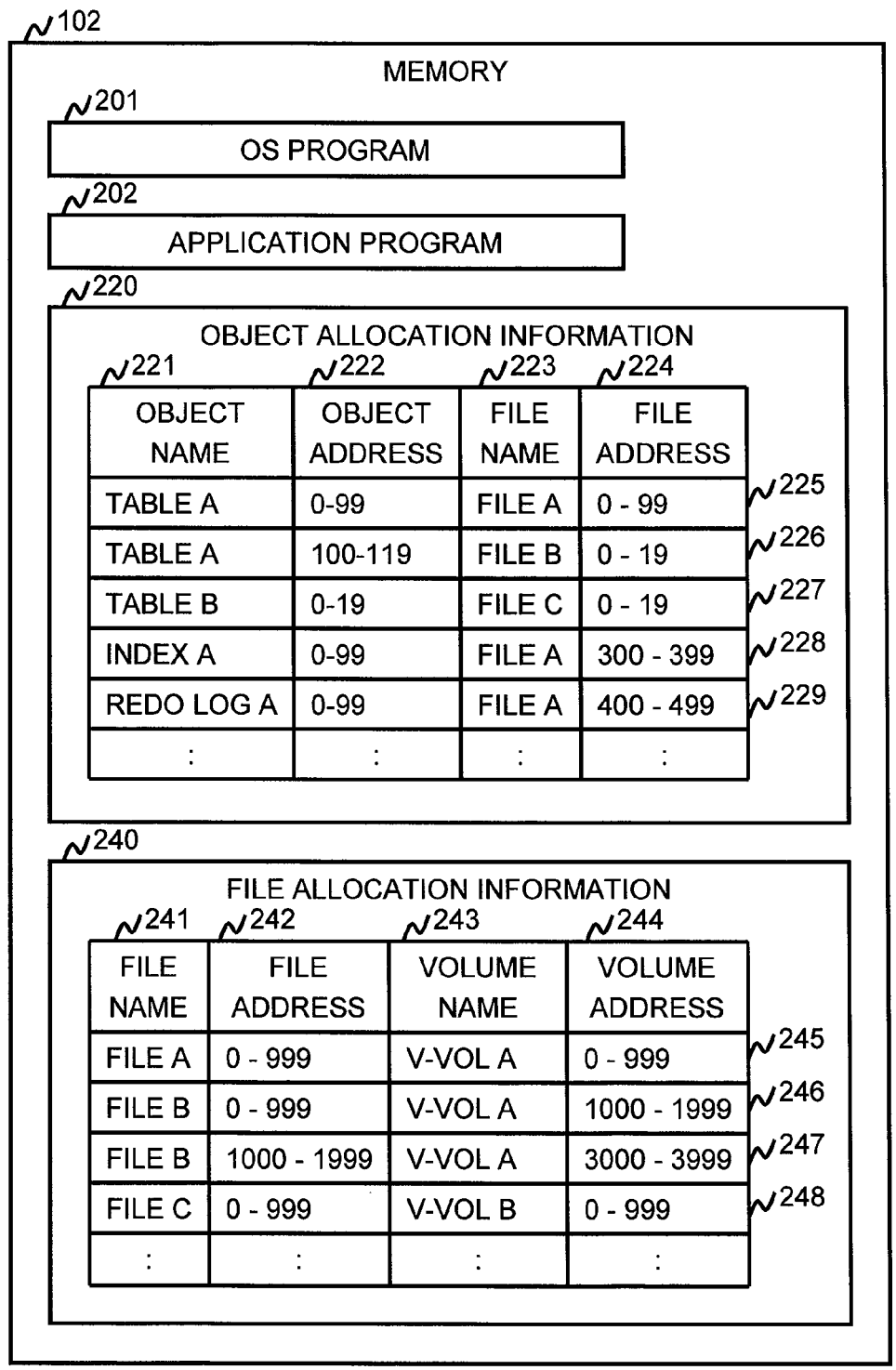
FIG. 2 illustrates an example of a memory in the application server of FIG. 1 according to the first embodiment of the invention.

FIG. 2 illustrates an example of a memory in the application server of FIG. 1 according to the first embodiment. The memory 102 comprises an OS (Operating System) program 201, an application program 202, object allocation information 220, and file allocation information 240. The OS program 201 executes the application program 202 and manages the file allocation information 240. The application program 202 (e.g., database program) reads data from the storage subsystem 160, processes data, writes the results to the storage subsystem 160, and manages the object allocation information 220. The object allocation information 220 is a table and includes columns of an object name 221, an object address 222, a file name 223, and a file address 224. For example, the row 225 shows that the address from "0" to "99" in "TABLE A" is allocated to the address from "0" to "99" in "FILE A." The file allocation information 240 is a table and includes columns of a file name 241, a file address 242, a volume name 243, and a volume address 244. For example, the row 245 shows that the address from "0" to "999" in "FILE A" is allocated to the address from "0" to "999" in "V-VOL A."

Figure 3:
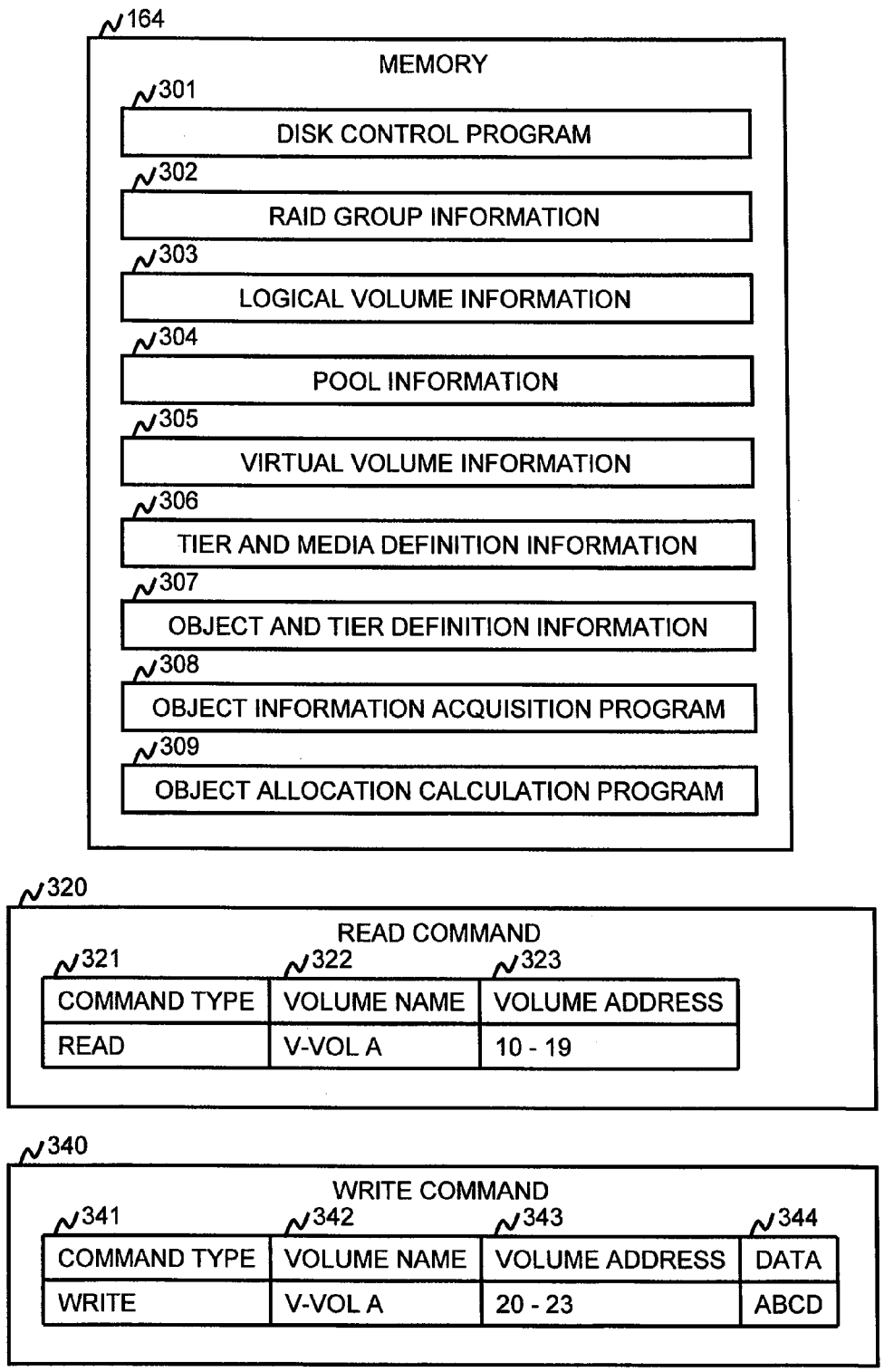
FIG. 3 illustrates an example of a memory in the storage subsystem of FIG. 1, a read command, and a write command.

FIG. 3 illustrates an example of the memory 164 in the storage subsystem 160 of FIG. 1, a read command 320, and a write command 340. The memory 164 comprises a disk control program 301, RAID (Redundant Arrays of Inexpensive (or Independent) Disks) group information 302, logical volume information 303, pool information 304, virtual volume information 305, tier and media definition information 306, object and tier definition information 307, an object information acquisition program 308, and an object allocation calculation program 309. The disk control program 301 receives a read command and a write command from the application server 100, reads data from the SSD 166 and the HDD 167, and writes data to the SSD 166 and the HDD 167 using the RAID group information 302, the logical volume information 303, the pool information 304, the virtual volume information 305, the tier and media definition information 306, and the object and tier definition information 307. The object information acquisition program 308 gets object information from the application server 100. The object allocation calculation program 309 calculates a location that an object is allocated by the application server 100.

The read command 320 includes a command type 321, a volume name 322, and a volume address 323. The read command 320 is sent from the application server 100 to the storage subsystem 160.

The write command 340 includes a command type 341, a volume name 342, a volume address 343, and data 344. The write command 340 is sent from the application server 100 to the storage subsystem 160.

FIG. 4 shows an example of RAID group information 302, the logical volume information 303, and the pool information 304.

The RAID group information 302 includes columns of a RAID group name 401, a media name 402, a media type 403, and a RAID level 404. For example, the row 405 shows that "RG A" has "SSD A," "SSD B," "SSD C," and "SSD D," the media type of "RG A" is "SSD," and the RAID level of "RG A" is "RAID 10 (2D+2D)."

The logical volume information 303 includes columns of a logical volume name 421, a logical volume address 422, a media type 423, a RAID group name 424, and a RAID group address 425. For example, the row 426 shows that the media type of "L-VOL A" is "SSD" and "L-VOL A" is allocated to the address from "0" to "9999" in "RG A."

The pool information 304 includes columns of a pool name 441, a logical volume name 442, and a virtual volume name 443. For example, the row 444 shows "POOL A" has "L-VOL A", "L-VOL B," and "L-VOL C," and the area of "POOL A" is used by "V-VOL A" and "V-VOL B."

FIG. 5 shows an example of the virtual volume information 305, the tier definition information 306, and the object and tier definition information 307.

The virtual volume information 305 includes columns of a virtual volume name 501, a virtual volume address 502, a logical volume name 503, and a logical volume address 504. For example, the row 505 shows that the address from "0" to "9" in "V-VOL A" is allocated to the address from "0" to "9" in "L-VOL A."

The tier and media definition information 306 includes columns of a tier 521 and a media type 522. For example, the row 524 shows an object defined that tier is "0" in the object and tier definition information 307 is allocated to "SSD" media.

The object and tier definition information 307 includes columns of an object name 541 and tier 542. For example, the row 543 shows that "TABLE A" is allocated to tier "0." The row 546 shows a default tier. The object that is not defined in the object name 541 is allocated to tier "1."

Figure 6:
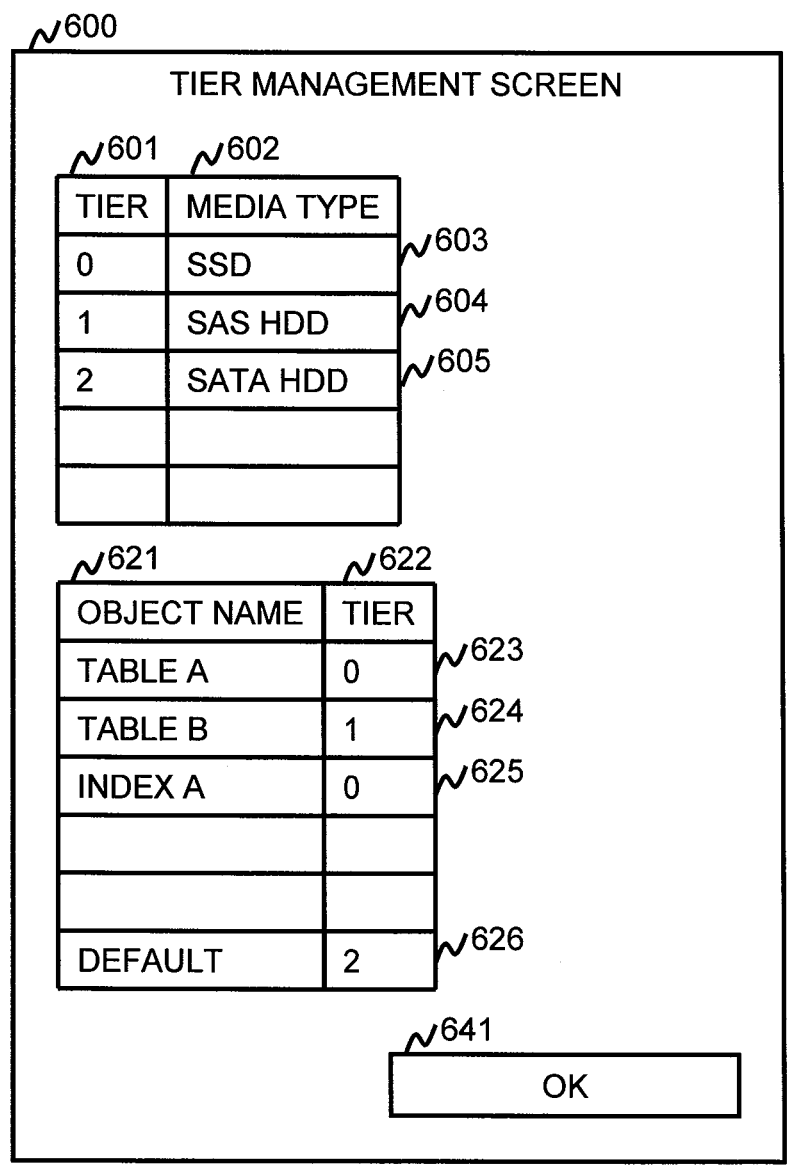
FIG. 6 shows an example of a tier management screen.

FIG. 6 shows an example of a tier management screen 600. An administrator inputs a tier 601, a media type 602, an object name 621, and a tier 622. The tier and media definition information 306 and the object and tier definition information 307 are updated to the data input by the administrator when the administrator push an "OK" button 641.

Figure 7:
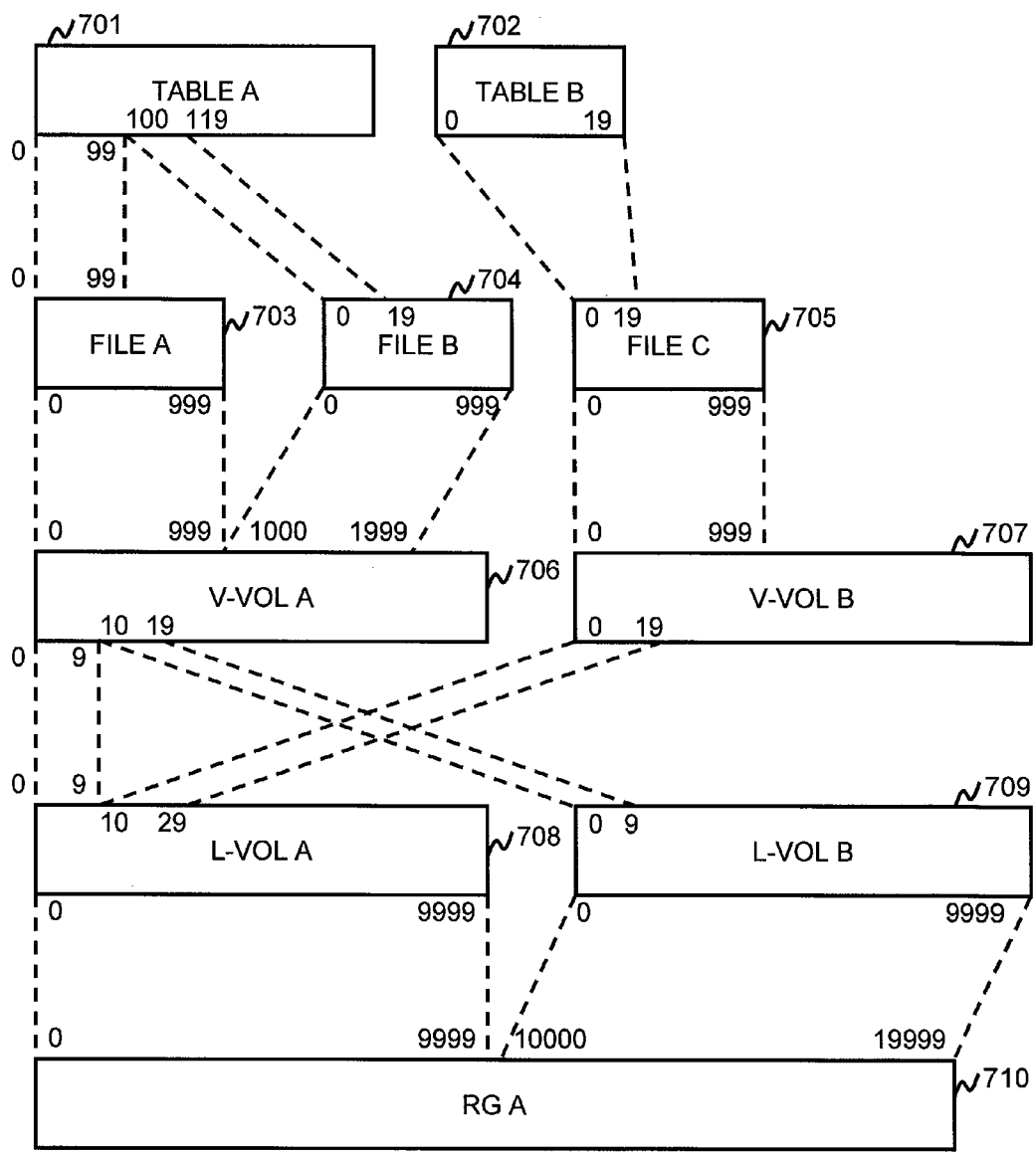
FIG. 7 shows an example of a diagram illustrating relationships between table and file, file and virtual volume, virtual volume and logical volume, and logical volume and RAID group according to the first embodiment.

FIG. 7 shows an example of a diagram illustrating relationships between table and file, file and virtual volume, virtual volume and logical volume, and logical volume and RAID group according to the first embodiment. FIG. 7 shows TABLE A 701, TABLE B 702, FILE A 703, FILE B 704, FILE C 705, V-VOL A 706, V-VOL B 707, L-VOL A 708, L-VOL B 709, and RG A 710.

B. Flow of Process

Figure 8:
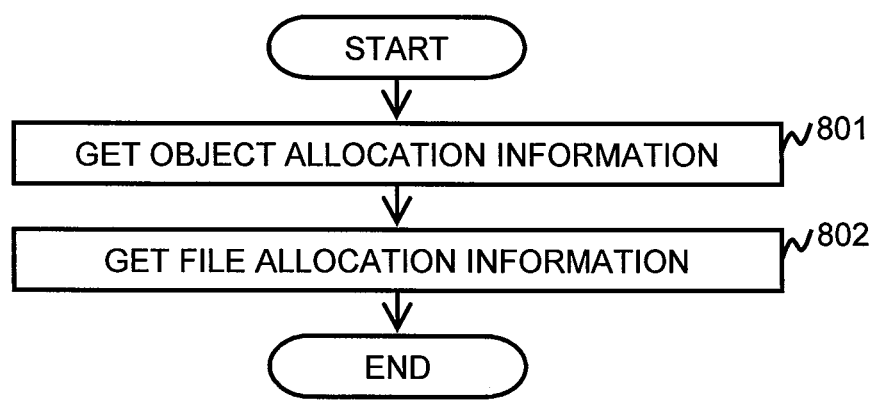
FIG. 8 is an example of a flow diagram showing the process of the object information acquisition program according to the first embodiment.

FIG. 8 is an example of a flow diagram showing that the object information acquisition program 309 gets the object allocation information 220 and the file allocation information 240 from the application server 100 regularly according to the first embodiment. In step 801, the object information acquisition program 309 gets the object allocation information 220 from the application server 100. In step 802, the object information acquisition program 309 gets the file allocation information 240 from the application server 100.

Figure 9:
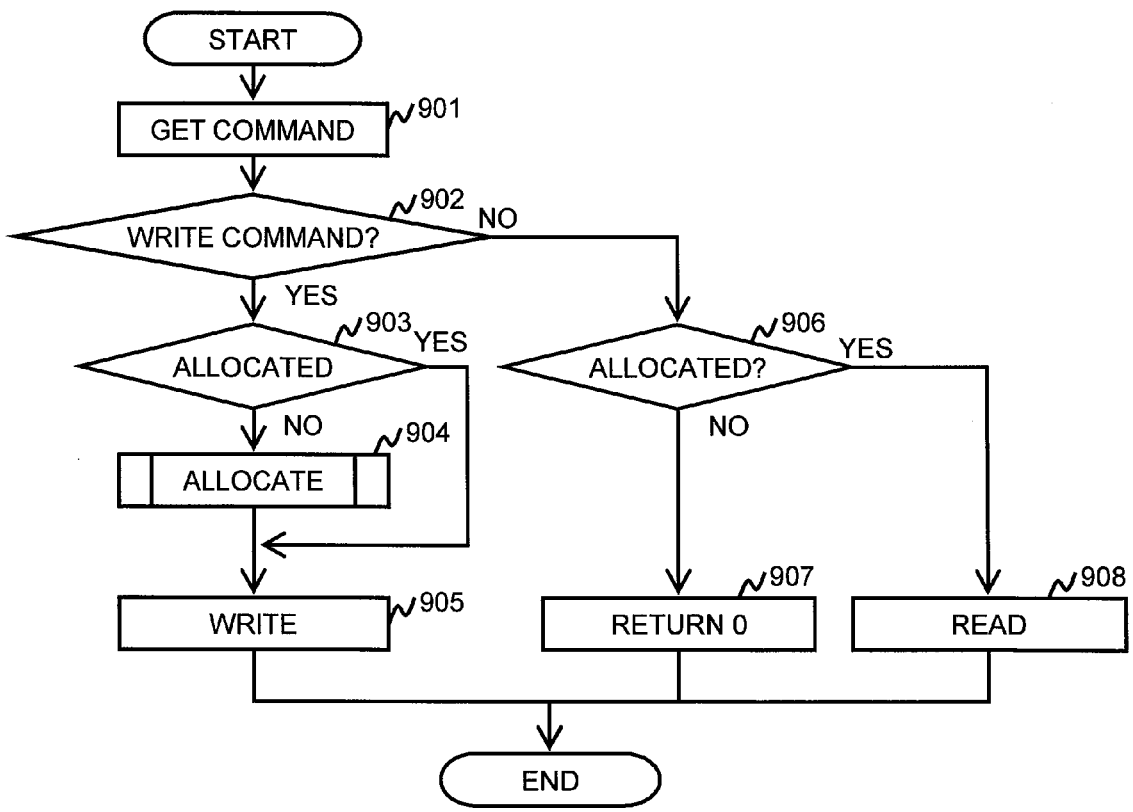
FIG. 9 is an example of a flow diagram showing read and write processes for the disk control program of the storage subsystem.

FIG. 9 is an example of a flow diagram showing that the storage subsystem 160 reads data from the SSD 166 and the HDD 167, and writes data to the SSD 166 and the HDD 167 when the storage subsystem 160 receives the read command 320 or the write command 340 from the application server 100.

In step 901, the disk control program 301 receives the read command 320 or the write command 340 from the application server 100. In step 902, if the command that the disk control program 301 received in step 901 is the write command 340, then the process goes to decision step 903; if not, then the process goes to decision step 906. In decision step 903, if the volume name 342 and the volume address 343 are allocated in the virtual volume information 305, then the process goes to step 905; if not, then the process goes to step 904. In step 904, the disk control program 301 allocates an area of a logical volume to an unallocated area of a virtual volume. In step 905, the disk control program 301 gets the volume name 342 and the volume address 343 from the write command 340, gets the logical volume name 503 and the logical volume address from the virtual volume information 305, gets the RAID group name 424 and the RAID group address 425 from the logical volume information 303, gets the media name 402 from the RAID group information 302, and writes the data 344 the SSD 166 and the HDD 167. In decision step 906, if the volume name 322 and the volume address 323 are allocated in the virtual volume information 305, then the process goes to step 908; if not, then the process goes to step 907. In step 907, the disk control program 301 returns "0" to the application server 100 because the area specified by the volume name 322 and the volume address 323 is not one to which data is written. In step 908, the disk control program 301 gets the volume name 322 and the volume address 323 from the read command 320, gets the logical volume name 503 and the logical volume address from the virtual volume information 305, gets the RAID group name 424 and the RAID group address 425 from the logical volume information 303, gets the media name 402 from the RAID group information 302, and reads data from the SSD 166 and the HDD 167.

Figure 10:
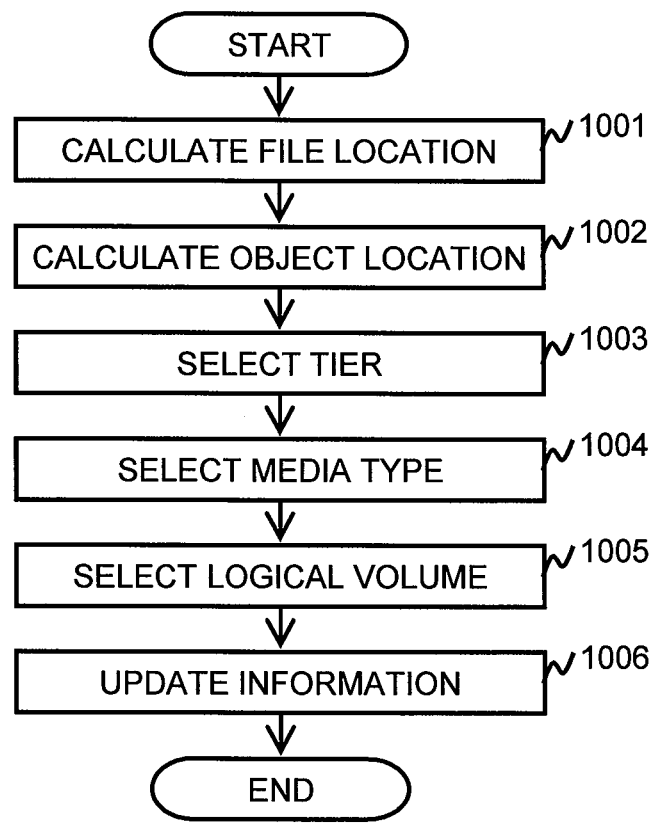
FIG. 10 is an example of a flow diagram showing the disk control program allocates an area of a logical volume to an unallocated area of a virtual volume according to the first embodiment.

FIG. 10 is an example of a flow diagram showing the disk control program 301 allocates an area of a logical volume to an unallocated area of a virtual volume according to the first embodiment.

In step 1001, the object allocation calculation program 309 of the storage subsystem calculates the file location specified by the write command 340. According to the write command 340 and the file allocation information 240, the address is from "20" to "23" in "FILE A." In step 1002, the object allocation calculation program 309 calculates the object location specified by the write command 340. According the result of step 1001 and the object allocation information 220, the address is from "20" to "23" in "TABLE A." In step 1003, the object allocation calculation program 309 selects a tier. According to the result of step 1002 and the object and tier definition information 307, the object allocation calculation program 309 selects tier "0." If the object is not defined in the object and tier definition information, then the object allocation calculation program 309 selects default tier "1." In step 1004, the object allocation calculation program 309 selects a media type. According to the result of step 1003 and the tier and media definition information, the media type is "SSD." In step 1005, the disk control program 301 selects a logical volume. The volume name 342 of the write command 340 is "V-VOL A." According to the pool information 304, "V-VOL A" belongs to "POOL A." "POOL A" comprises "L-VOL A," "L-VOL B," and "L-VOL C." According to the logical volume information 303, the media type 423 of "L-VOL A" is SSD and the media type 423 of "L-VOL B" is SSD. Therefore the disk control 301 program can select "L-VOL A" or "L-VOL B." In step 1006, the disk control program 301 updates the virtual volume information 305 to the result of step 1005.

Figure 11:
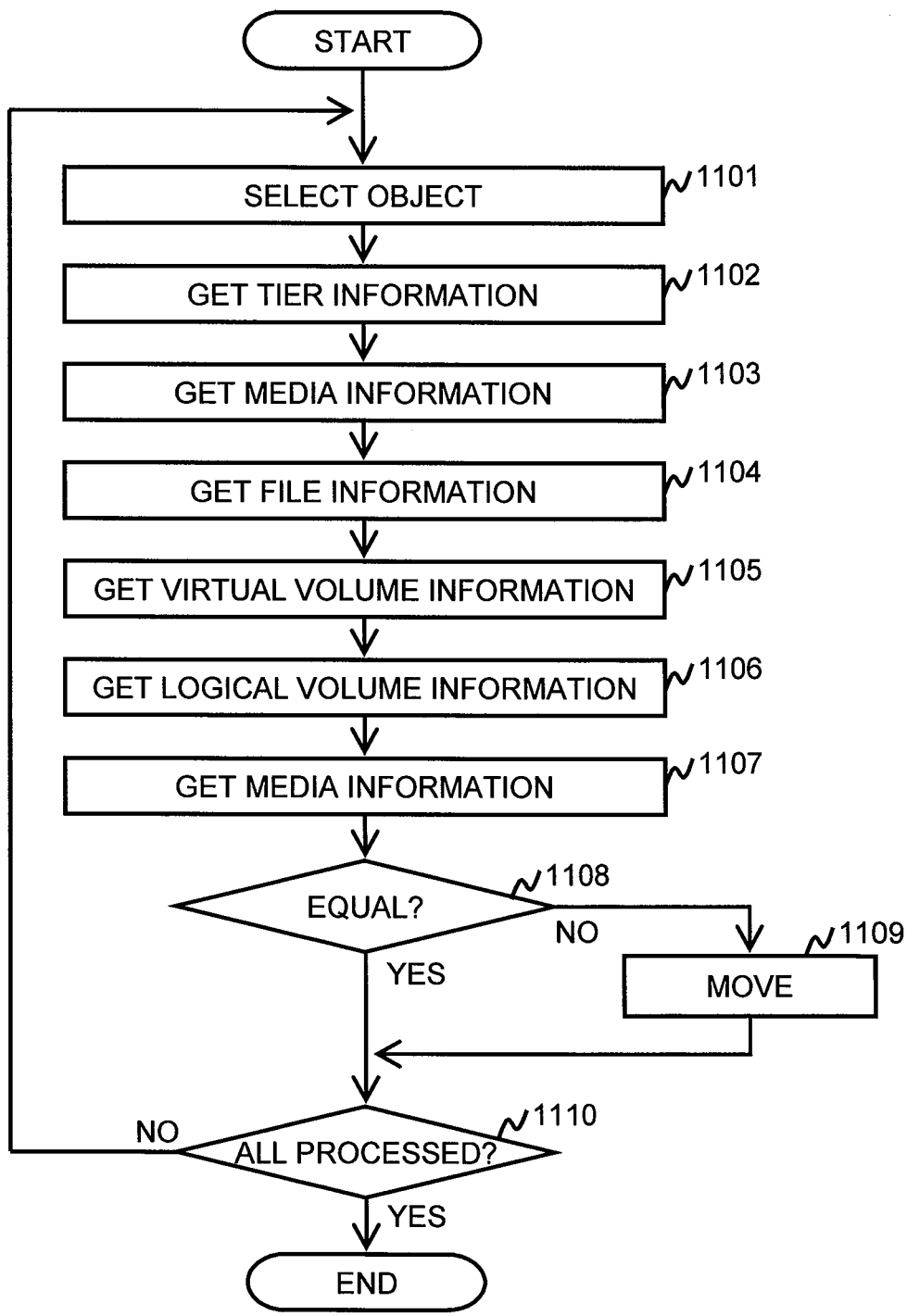
FIG. 11 is an example of a flow diagram showing tier migration when the tier and media definition information or the object and tier definition information are changed using the tier management screen according to the first embodiment.

FIG. 11 is an example of a flow diagram showing tier migration when the tier and media definition information 306 or the object and tier definition information 307 are changed using the tier management screen 600 according to the first embodiment.

In step 1101, the object allocation calculation program 309 selects one object from the object name 541. In step 1102, the object allocation calculation program 309 gets the tier 542 corresponding to the selected object at step 1101. For example, the object allocation calculation program 309 gets tier "2" when "TABLE B" is selected in step 1101. In step 1103, the object allocation calculation program 309 gets the media type 522 corresponding to the selected tier at step 1102. For example, the object allocation calculation program 309 gets "SATA HDD" when tier "2" is selected at step 1102. In step 1104, the object allocation calculation program 309 gets the file name 223 and the file address 224 corresponding to the selected object at step 1101. For example, the object allocation calculation program 309 gets a file name "FILE C" and an address from "0" to "19" when "TABLE B" is selected in step 1101. In step 1105, the object allocation calculation program 309 gets the volume name 243 and the volume address 244 corresponding to the file name and the address obtained at step 1104. For example, the object allocation calculation program 309 gets a virtual volume name "V-VOL B" and a virtual volume address from "0" to "19." In step 1106, the disk control program 301 gets the logical volume name 503 and the logical volume address 504 corresponding to the volume name and the volume name obtained at step 1105. For example, the disk control program 301 gets a logical volume name "L-VOL A" and an address from "10" to "29." In step 1107, the disk control program 301 gets the media type 423 corresponding to the logical volume obtained at step 1106. For example, the disk control program 301 gets a media type "SSD."

In judgment step 1108, if the media type obtained at step 1103 equals the media type obtained at step 1107, then the process goes to judgment step 1110; if not, then the process goes to step 1009. In step 1109, the disk control program 301 moves the selected object to the tier specified by the object and tier definition information 307 and updates the virtual volume information 305 for the selected object. In judgment step 1110, if all objects in the object name 541 are not processed, then the process goes back to step 1101; otherwise, the process ends.

Second Embodiment

The embodiment shows relationships involving object to virtual volume to logical volume to RAID group. Only the differences between the second embodiment and the first embodiment are described. An object is stored, not in file system but virtual volume directly, in the second embodiment. The application program 202 manages object allocation.

A. System Configuration

Figure 12:
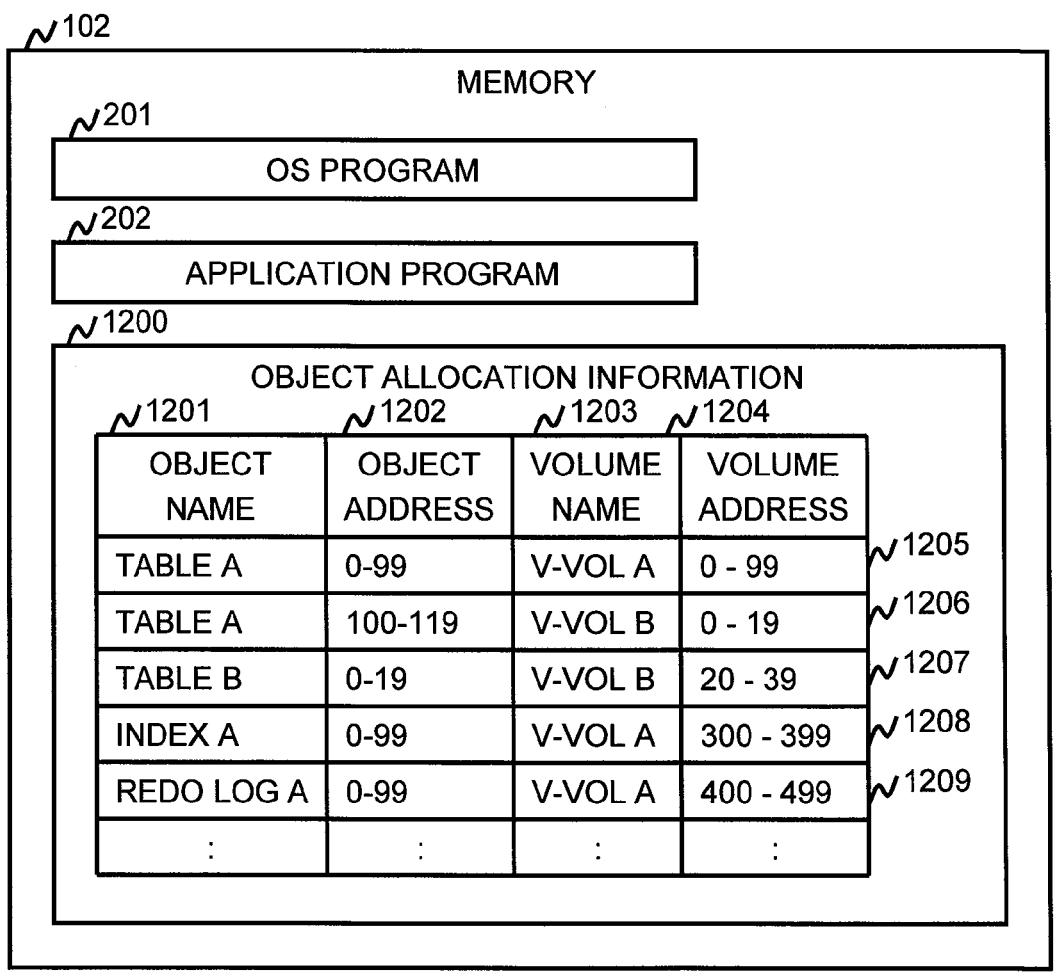
FIG. 12 illustrates an example of a memory in the application server of FIG. 1 according to the second embodiment of the invention.

FIG. 12 illustrates an example of a memory in the application server of FIG. 1 according to the second embodiment (see FIG. 2 of the first embodiment). The memory 102 comprises an OS program 201, an application program 202, and object allocation information for file 1200. The object allocation information for file 1200 is a table and includes columns of an object name 1201, an object address 1202, a volume name 1203, and a volume address 1204.

Figure 13:
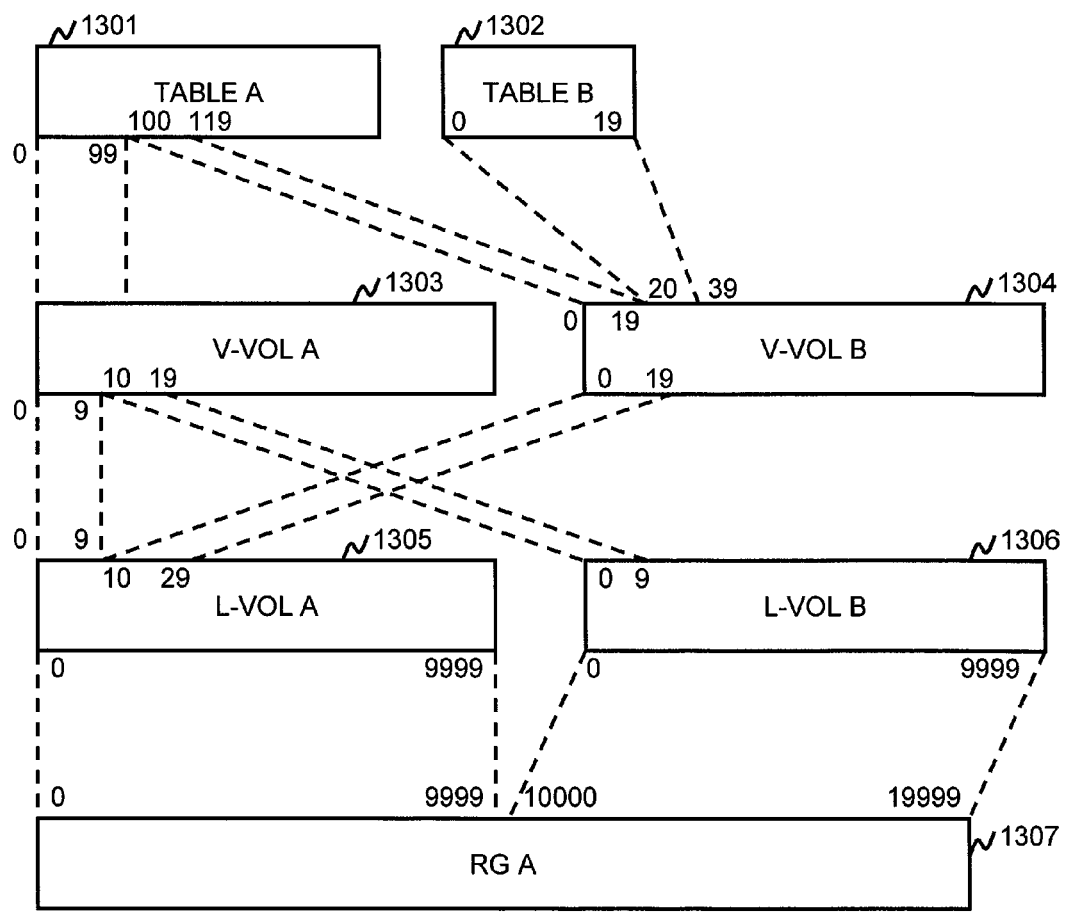
FIG. 13 shows an example of a diagram illustrating relationships between table and virtual volume, virtual volume and logical volume, and logical volume and RAID group according to the second embodiment.

FIG. 13 shows an example of a diagram illustrating relationships between table and virtual volume, virtual volume and logical volume, and logical volume and RAID group according to the second embodiment (see FIG. 7 of the first embodiment). FIG. 13 shows TABLE A 1301, TABLE B 1302, V-VOL A 1303, V-VOL B 1304, L-VOL A 1305, L-VOL B 1306, and RG A 1307.

B. Flow of Process

Figure 14:
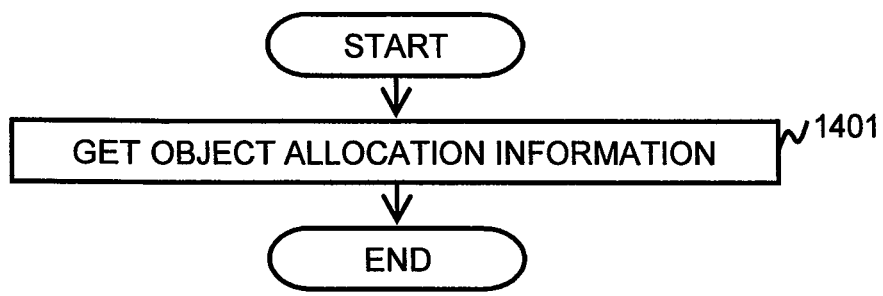
FIG. 14 is an example of a flow diagram showing the process of the object information acquisition program according to the second embodiment.

FIG. 14 is an example of a flow diagram showing that the object information acquisition program 309 gets the object allocation information 1200 from the application server 100 regularly according to the second embodiment (see FIG. 8 of the first embodiment). In step 1401, the object information acquisition program 309 gets the object allocation information 1200 from the application server 100.

Figure 15:
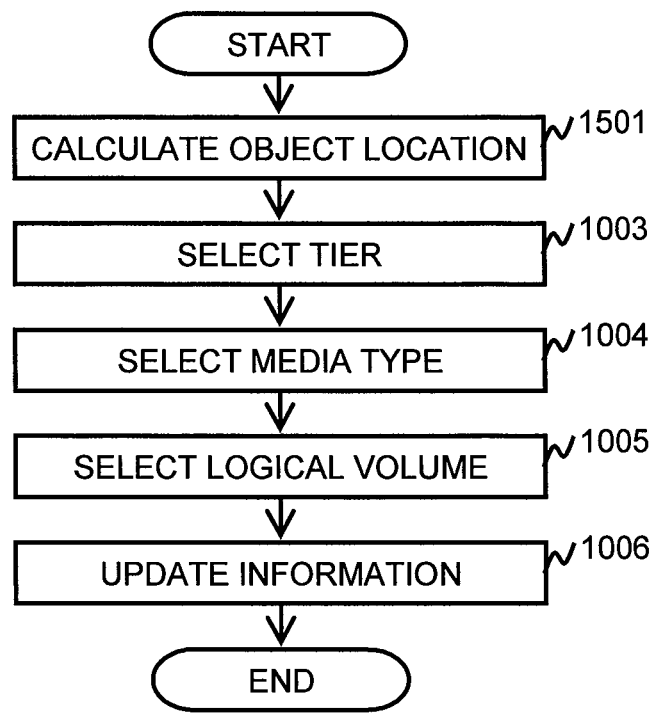
FIG. 15 is an example of a flow diagram showing the disk control program allocates an area of a logical volume to an unallocated area of a virtual volume according to the second embodiment.

FIG. 15 is an example of a flow diagram showing that the disk control program allocates an area of a logical volume to an unallocated area of a virtual volume according to the second embodiment (see FIG. 10 of the first embodiment). In step 1501, the object allocation calculation program 309 calculates the volume location specified by the write command 340. According to the write command 340 and the object allocation information, the address is from "20" to "23" in "TABLE A."

Figure 16:
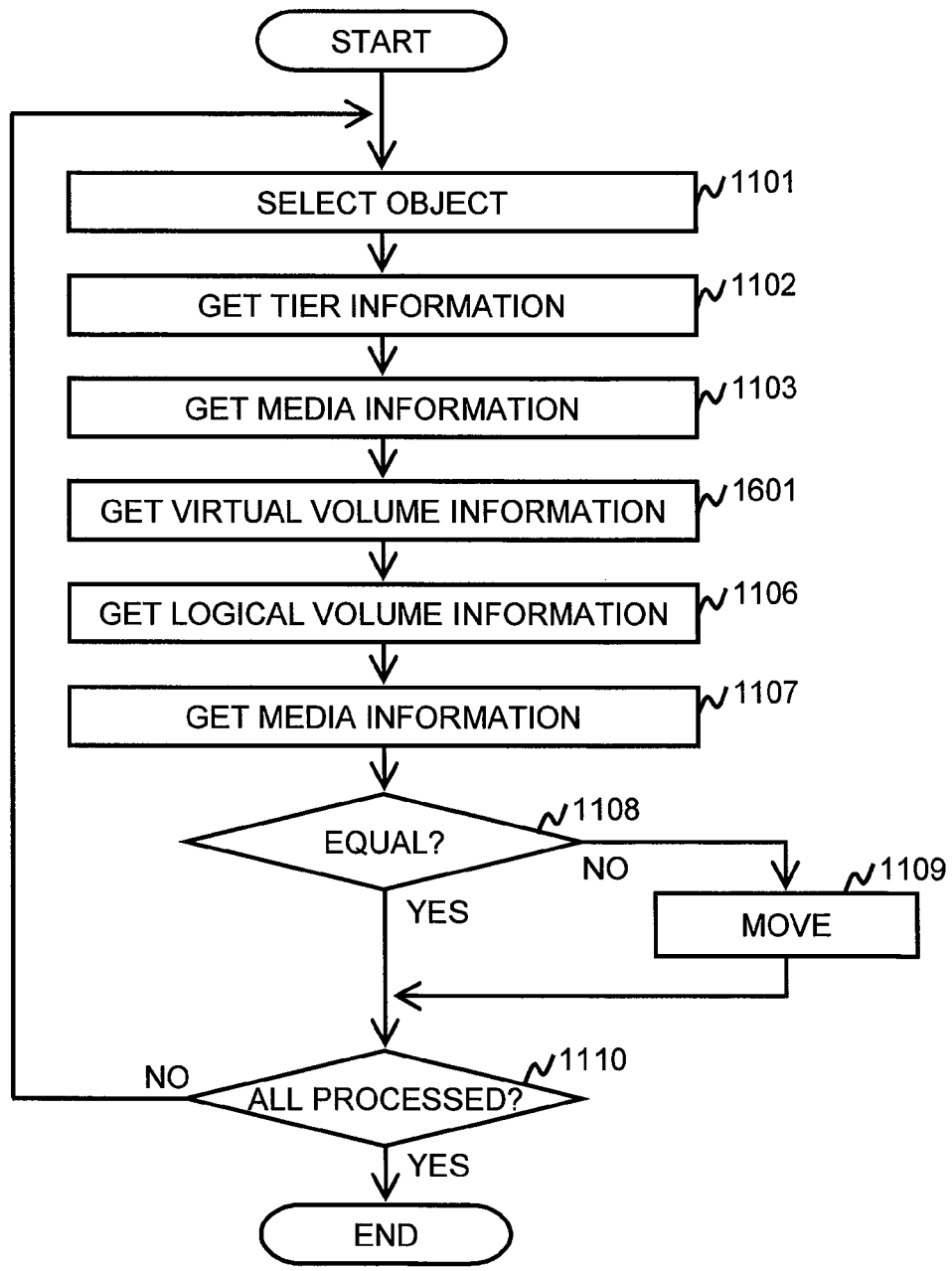
FIG. 16 is an example of a flow diagram showing tier migration when the tier and media definition information or the object and tier definition information are changed using the tier management screen according to the second embodiment.

FIG. 16 is an example of a flow diagram showing tier migration when the tier and media definition information 306 or the object and tier definition information 307 are changed using the tier management screen 600 according to the second embodiment (see FIG. 11 of the first embodiment). In step 1601, the object allocation calculation program 309 gets the volume name 1203 and the volume address 1204 corresponding to the selected object at step 1101. For example, the object allocation calculation program 309 gets a file name "V-VOL B" and an address from "20" to "39" when "TABLE B" is selected at step 1101.

Third Embodiment

The embodiment shows relationships involving object to virtual HDD to virtual volume to logical volume to RAID group. Only the differences between the third embodiment and the first embodiment are described. An object is stored, not in file system but VHD (Virtual HDD), in the third embodiment. The hypervisor program 1701 manages object allocation.

A. System Configuration

Figure 17:
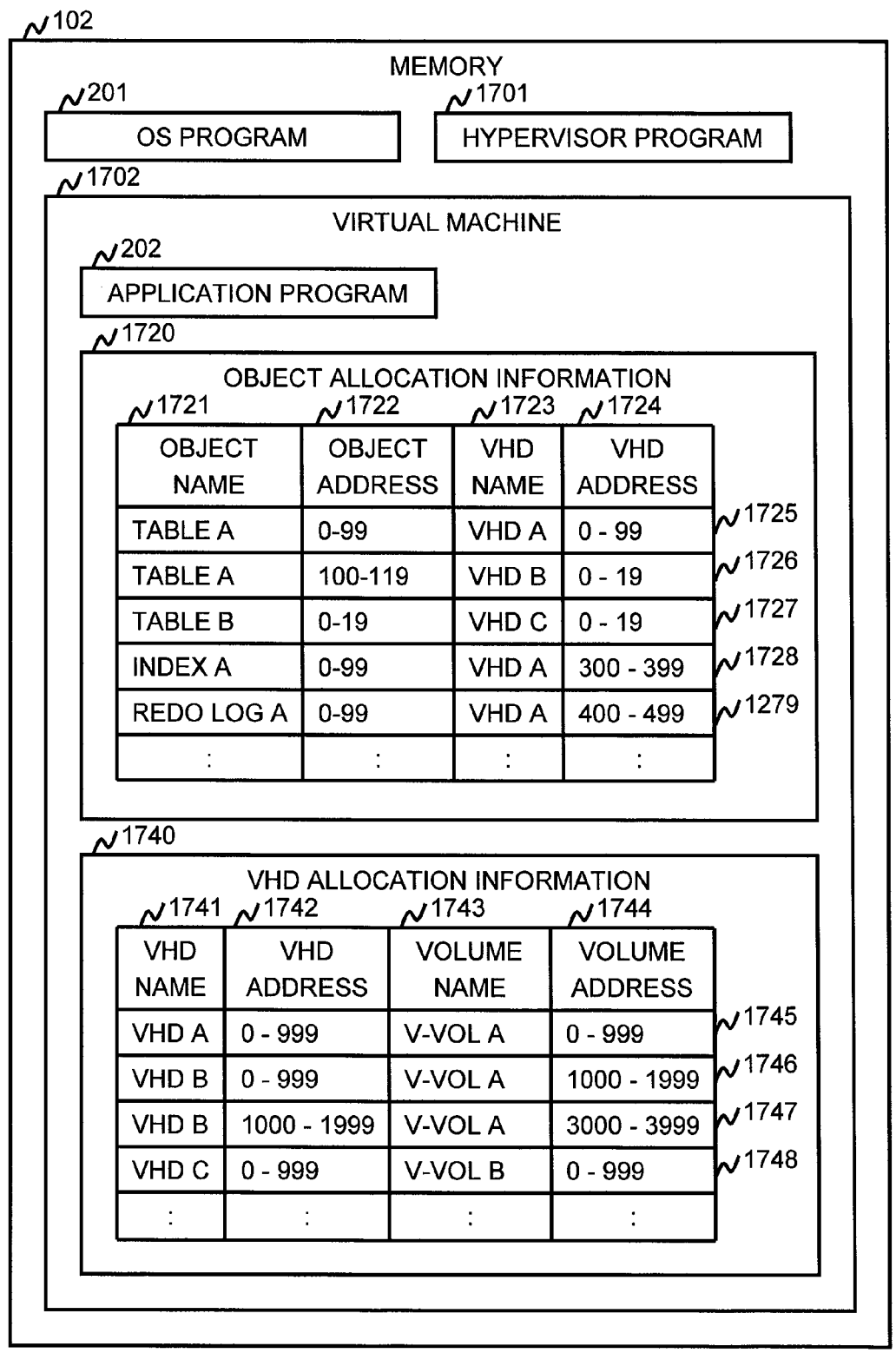
FIG. 17 illustrates an example of a memory in the application server of FIG. 1 according to the third embodiment of the invention.

FIG. 17 illustrates an example of a memory in the application server of FIG. 1 according to the second embodiment (see FIG. 2 of the first embodiment). The memory 102 comprises an OS program 201, an application program 202, a hypervisor program 1701, a virtual machine 1702, object allocation information for VHD 1720, and VHD allocation information 1740. The hypervisor program 1701 runs the virtual machine 1702. The virtual machine 1702 runs the application program 202. The object allocation information for VHD 1720 is a table and includes columns of an object name 1721, an object address 1722, a VHD name 1723, and a VHD address 1724. For example, the row 1725 shows the address from "0" to "99" in "TABLE A" is allocated to the address from "0" to "99" in "VHD A." The VHD allocation information 1740 is a table and includes columns of a VHD name 1741, a VHD address 1742, a volume name 1743, and a volume address 1744. For example, the row 1745 shows the address from "0" to "999" in "VHD A" is allocated to the address from "0" to "999" in "V-VOL A."

Figure 18:
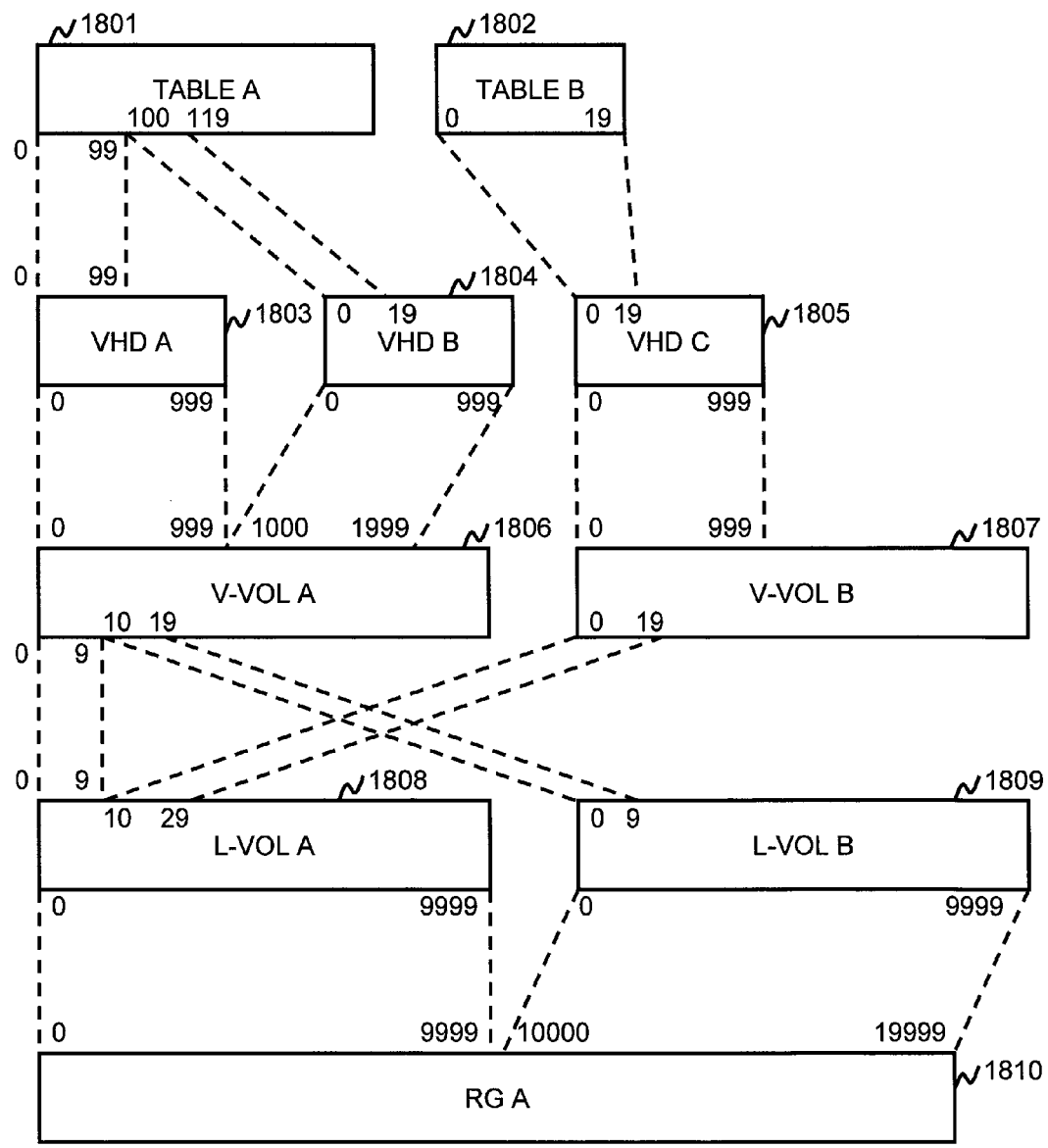
FIG. 18 is an example of a diagram illustrating relationships between table and VHD, VHD and virtual volume, virtual volume and logical volume, and logical volume and RAID group according to the third embodiment.

FIG. 18 is an example of a diagram illustrating relationships between table and VHD, VHD and virtual volume, virtual volume and logical volume, and logical volume and RAID group according to the third embodiment (see FIG. 2 of the first embodiment). FIG. 18 shows TABLE A 1801, TABLE B 1802, VHD A 1803, VHD B 1804, VHD C 1805, V-VOL A 1806, V-VOL B 1807, L-VOL A 1808, L-VOL B 1809, and RG A 1810.

B. Flow of Process

Figure 19:
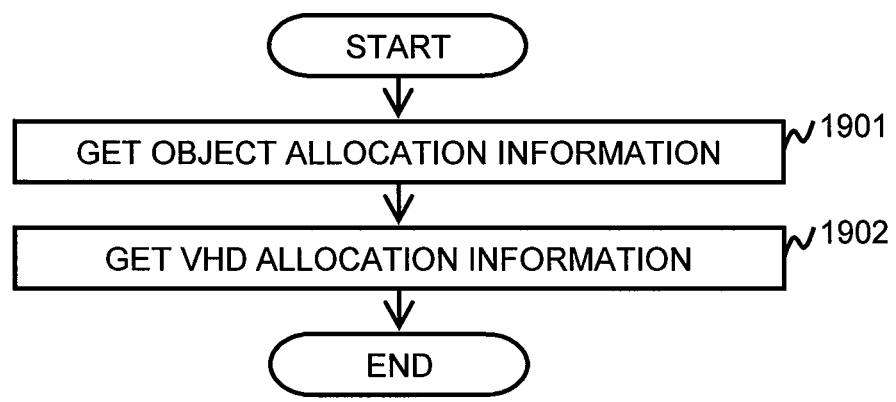
FIG. 19 is an example of a flow diagram showing the process of the object information acquisition program according to the third embodiment.

FIG. 19 is an example of a flow diagram showing that the object information acquisition program 309 gets the object allocation information 1720 and the file allocation information 1740 from the virtual machine 1702 regularly according to the third embodiment (see FIG. 8 of the first embodiment). In step 1901, the object information acquisition program 309 gets the object allocation information 1720 from the application server 100. In step 1902, the object information acquisition program 309 gets the VHD allocation information 1740 from the application server 100.

Figure 20:
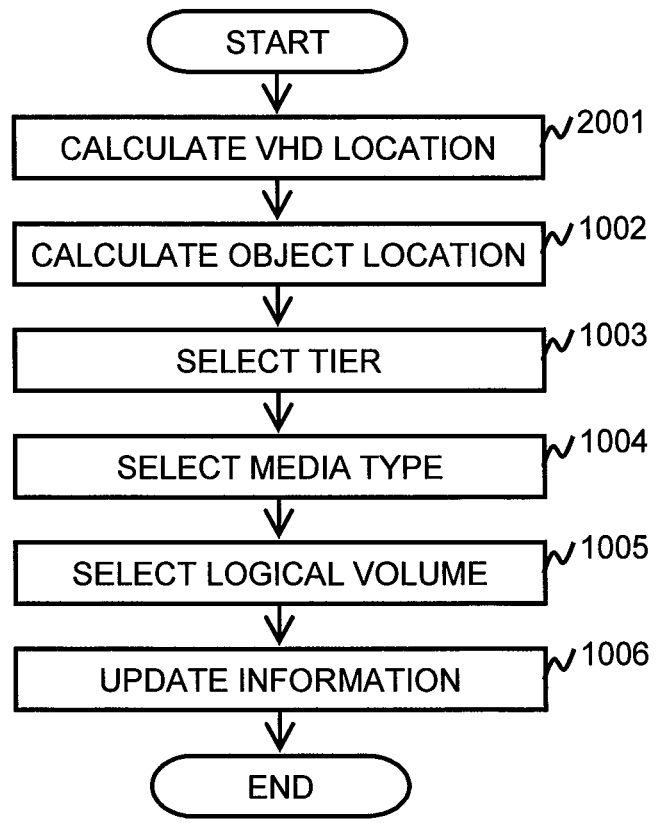
FIG. 20 is an example of a flow diagram showing the disk control program allocates an area of a logical volume to an unallocated area of a virtual volume according to the third embodiment.

FIG. 20 is an example of a flow diagram showing the disk control program allocates an area of a logical volume to an unallocated area of a virtual volume according to the third embodiment (see FIG. 10 of the first embodiment). In step 2001, the object allocation calculation program 309 calculates the VHD location specified by the write command 340. According to the write command 340 and the VHD allocation information 1740, the address is from "20" to "23" in "VHD A."

Figure 21:
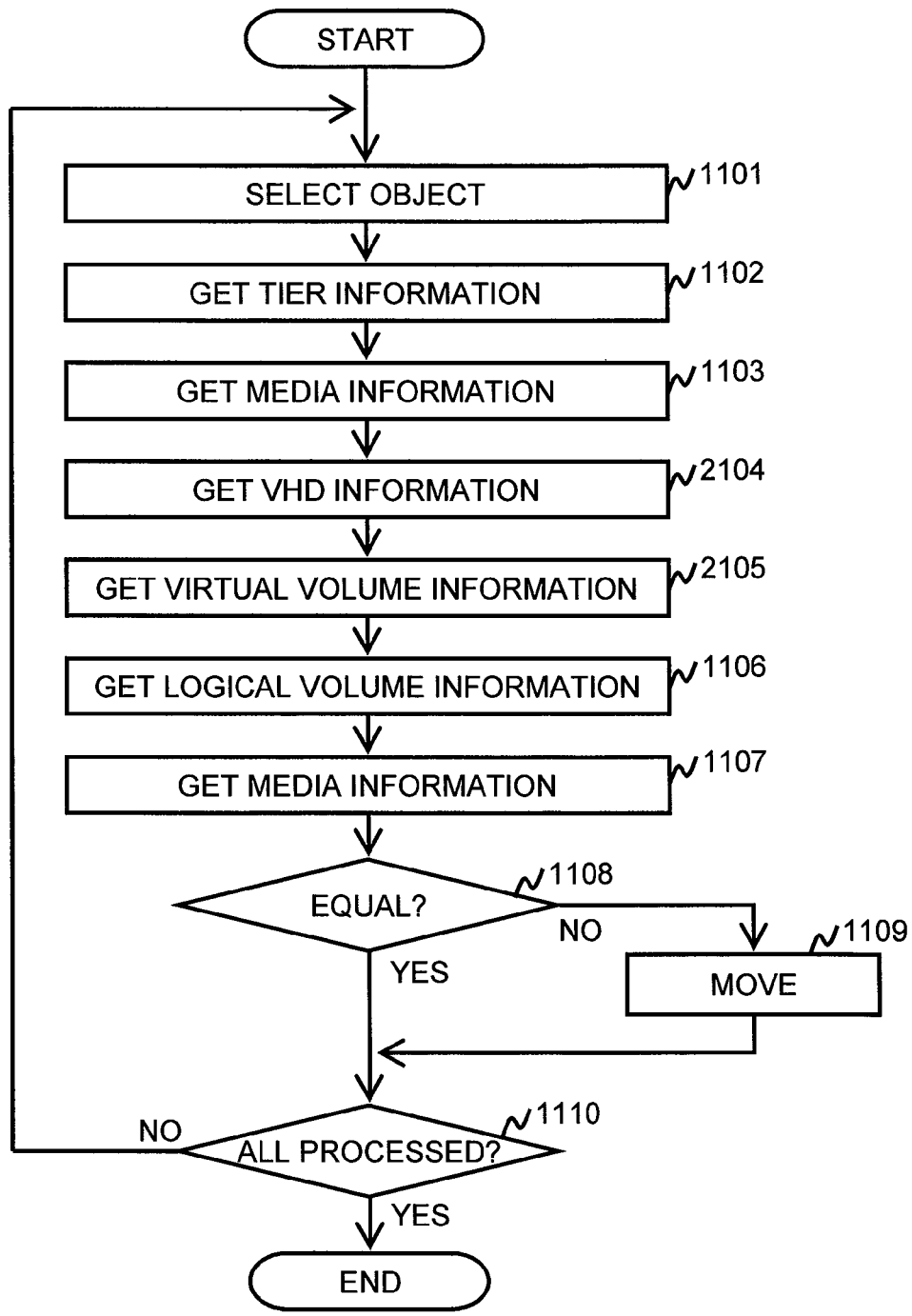
FIG. 21 is an example of a flow diagram showing tier migration when the tier and media definition information or the object and tier definition information are changed using the tier management screen according to the third embodiment.

FIG. 21 is an example of a flow diagram showing tier migration when the tier and media definition information 306 or the object and tier definition information 307 are changed using the tier management screen 600 according to the third embodiment (see FIG. 11 of the first embodiment).

In step 2104, the object allocation calculation program 309 gets the VHD name 1723 and the VHD address 1724 corresponding to the selected object at step 1101. For example, the object allocation calculation program 309 gets a VHD name "VHD C" and an address from "0" to "19" when "TABLE B" is selected at step 1101. In step 2105, the object allocation calculation program 309 gets the volume name 1743 and the volume address 1744 corresponding to the VHD name and the address obtained at step 2104. For example, the object allocation calculation program 309 gets a virtual volume name "V-VOL B" and a virtual volume address from "0" to "19."

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing object based tier to improve allocation of media to unallocated area. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
a plurality of types of storage devices being configured to be used for forming a plurality of levels of storage tiers, each of the plurality of levels of storage tiers having a plurality of storage areas, a storage area of the plurality of storage areas being allocated to a volume of a plurality of volumes for storing data in accordance with receiving a write command to the volume, the data being data of an object of a plurality of objects handled by a computer coupled to the storage system; and
a processor being operable to manage first information between the object and an address in the volume allocated by the computer for storing the object based on information of the object received from the computer, and being operable to obtain a type of storage device of the plurality of types of storage devices corresponding to a level of the plurality of levels of storage tiers defined for storing the data of the object based on a name identifying the object, and being operable to move data of the object from another type of storage device of the plurality of types of storage devices calculated as a location storing the data of the object by using the first information, to the obtained type of storage device.

2. The storage system according to the claim 1,
wherein the processor is operable to calculate a level of storage tier corresponding to said another type of storage device as the location storing the data of the object by using the first information.

3. The storage system according to the claim 1,
wherein the processor is operable to manage the defined level of storage tier corresponding to the obtained type of storage device.

4. The storage system according to the claim 1,
wherein the processor is operable to allocate a storage area of the plurality of storage areas to the volume for storing data in accordance with receiving the write command to the volume.

5. The storage system according to the claim 1,
wherein the first information includes a relationship among the object, an address in a file handled by the computer, and the address in the volume.

6. The storage system according to the claim 1,
wherein the first information includes a relationship among the object, an address in a virtual Hard Disk Drive (HDD) handled by the computer, and the address in the volume.

7. The storage system according to the claim 1,
wherein the object is a table or an index.

8. The storage system according to the claim 1,
wherein the plurality of types of storage devices include at least two or more types of storage devices among Solid State Drive (SSD), Serial Attached SCSI (SAS) storage device, and Serial Advanced Technology Attachment (SATA) storage device.

9. A method of managing a plurality of types of storage devices being configured to be used for forming a plurality of levels of storage tiers in a storage system, each of the plurality of levels of storage tiers having a plurality of storage areas, a storage area of the plurality of storage areas to be allocated to a volume of a plurality of volumes for storing data in accordance with receiving a write command to the volume, the data being data of an object of a plurality of objects handled by a computer coupled to the storage system, the method comprising:

managing first information between the object and an address in the volume allocated by the computer for storing the object based on information of the object received from the computer;

obtaining a type of storage device of the plurality of types of storage devices corresponding to a level of the plurality of levels of storage tiers defined for storing the data of the object based on a name identifying the object; and moving data of the object from another type of storage device of the plurality of types of storage devices calculated as a location storing the data of the object by using the first information, to the obtained type of storage device.

10. The method according to the claim 9, further comprising:

calculating a level of storage tier corresponding to said another type of storage device as the location storing the data of the object by using the first information.

11. The method according to the claim 9, further comprising:

managing the defined level of storage tier corresponding to the obtained type of storage device.

12. The method according to the claim 9, further comprising:

allocating a storage area of the plurality of storage areas to the volume for storing data in accordance with receiving the write command to the volume.

13. The method according to the claim 9, wherein the first information includes a relationship among the object, an address in a file handled by the computer, and the address in the volume.

14. The method according to the claim 9, wherein the first information includes a relationship among the object, an address in a virtual Hard Disk Drive (HDD) handled by the computer, and the address in the volume.

15. The method according to the claim 9, wherein the object is a table or an index.

16. The method according to the claim 9, wherein the plurality of types of storage devices include at least two or more types of storage devices among Solid State Drive (SSD), Serial Attached SCSI (SAS) storage device, and Serial Advanced Technology Attachment (SATA) storage device.

17. A non-transitory computer-readable storage medium storing a plurality of instructions for controlling a data processor to manage a plurality of types of storage devices being configured to be used for forming a plurality of levels of storage tiers in a storage system, each of the plurality of levels of storage tiers having a plurality of storage areas, a storage area of the plurality of storage areas to be allocated to a volume of a plurality of volumes for storing data in accordance with receiving a write command to the volume, the data being data of an object of a plurality of objects handled by a computer coupled to the storage system, the plurality of instructions comprising:

instructions that cause the data processor to manage first information between the object and an address in the volume allocated by the computer for storing the object based on information of the object received from the computer;

instructions that cause the data processor to obtain a type of storage device of the plurality of types of storage devices corresponding to a level of the plurality of levels of storage tiers defined for storing the data of the object based on a name identifying the object; and instructions that cause the data processor to move data of the object from another type of storage device of the plurality of types of storage devices calculated as a location storing the data of the object by using the first information, to the obtained type of storage device.

18. The non-transitory computer-readable storage medium according to the claim 17, wherein the plurality of instructions further comprise:

instructions that cause the data processor to calculate a level of storage tier corresponding to said another type of storage device as the location storing the data of the object by using the first information.

19. The non-transitory computer-readable storage medium according to the claim 17, wherein the plurality of instructions further comprise:

instructions that cause the data processor to manage the defined level of storage tier corresponding to the obtained type of storage device.

20. The non-transitory computer-readable storage medium according to the claim 17, wherein the plurality of instructions further comprise:

instructions that cause the data processor to allocate a storage area of the plurality of storage areas to the volume for storing data in accordance with receiving the write command to the volume.

\* \* \* \* \*